United States Patent [19]

Uraneck et al.

[11] 4,258,162

[45] Mar. 24, 1981

[54] POLYMERS OF CONJUGATED DIENES WHICH HAVE TERMINAL CONJUGATED UNSATURATED ALICYCLIC FUNCTIONAL GROUPS

[75] Inventors: Carl A. Uraneck; John E. Burleigh, both of Bartlesville, Okla.

[73] Assignee: Phillips Petroleum Company, Bartlesville, Okla.

[21] Appl. No.: 55,680

[22] Filed: Jul. 10, 1979

[51] Int. Cl.³ .................. C08F 4/48; C08C 19/32; C08C 19/30; C08C 19/40
[52] U.S. Cl. ........................ 526/173; 526/82; 525/130; 525/153; 525/154; 525/242; 525/285; 525/288; 525/292; 525/297; 525/316; 525/354; 525/356; 525/359; 525/374; 525/381; 525/383; 525/384; 525/385; 525/386
[58] Field of Search ........................ 526/173

[56] References Cited

U.S. PATENT DOCUMENTS

| | | | |
|---|---|---|---|
| 3,560,593 | 2/1971 | Hsieh | 526/173 |
| 3,734,972 | 5/1973 | Naylor et al. | 526/173 |
| 3,884,889 | 5/1975 | Hsieh | 526/173 |

OTHER PUBLICATIONS

Rec. Trav. Chim. 95; 225 (1976); Journal of Royal Netherlands Chem. Soc., Nieuwstad et al.
Ionic Polymerization, (Furukawa et al.), Dekker Inc. 1976, "Dienes Bearing Allylic Protons"; Yasuda et al. Jour. Pol. Sci. Part B, (Polymer Letters), 10; 17-22, (1972).

*Primary Examiner*—William F. Hamrock

[57] ABSTRACT

Alicyclic organomonolithium compounds having delocalized conjugated unsaturation are effective initiators in the preparation of polymers of conjugated dienes. Polymers of conjugated dienes, prepared with or without the alicyclic organomonolithium compounds, are terminated with alicyclic compounds having conjugated unsaturation. Either or both approaches can be used to provide polymers containing alicylic conjugated unsaturated functional groups. Alternatively, polymers prepared from the alicyclic organomonolithium compounds can be coupled to produce linear or branched polymers. Polymers prepared from multichelic lithium compounds also can be terminated with alicyclic conjugated unsaturated compounds.

42 Claims, No Drawings

POLYMERS OF CONJUGATED DIENES WHICH HAVE TERMINAL CONJUGATED UNSATURATED ALICYCLIC FUNCTIONAL GROUPS

FIELD OF THE INVENTION

The invention pertains to conjugated diene polymers containing alicyclic conjugated unsaturated functional groups.

BACKGROUND OF THE INVENTION

Polymers of conjugated dienes, although having a rather wide range of application and utility, experience certain limitations due to their lack of highly reactive functional groups suitable as sites for a variety of different polymer modification and vulcanization reactions. Noticeably absent are reactive terminal functional groups which could provide superior vulcanizate properties. One of the more versatile highly reactive functional groups with respect to the type of chemistry typically involved with anionically initiated solution polymers is a hydrocarbyl moiety containing conjugated unsaturation. Thus, it would be highly desirable for the purpose of polymer modification and superior vulcanization to have polymers of conjugated dienes having terminal conjugated unsaturated functional groups.

BRIEF DESCRIPTION OF THE INVENTION

Alicyclic organomonolithium compounds having delocalized conjugated unsaturation are effective initiators in the preparation of polymers of conjugated dienes. Polymers of conjugated dienes, prepared with or without the alicyclic organomonolithium compounds, are terminated with alicyclic compounds having conjugated unsaturation. Either or both approaches can be used to provide polymers containing alicyclic conjugated unsaturated functional groups. Alternatively, polymers prepared from the alicyclic organomonolithium compounds can be coupled to produce linear or branched polymers. Polymers prepared from multichelic lithium compounds also can be terminated with alicyclic conjugated unsaturated compounds.

DETAILED DESCRIPTION OF THE INVENTION

The several types of conjugated unsaturated alicyclic-terminated polymers of our invention and the general reactions for preparing them are shown in Table I. Cycloheptatriene and the initiator prepared from this alicyclic triene are used as examples of the capping compound and initiator in this table. The only products shown for these reactions are those containing conjugated unsaturated terminal groups, polymers containing the non-conjugated diene terminal groups, which can also be formed, not being shown in these reactions.

TABLE I

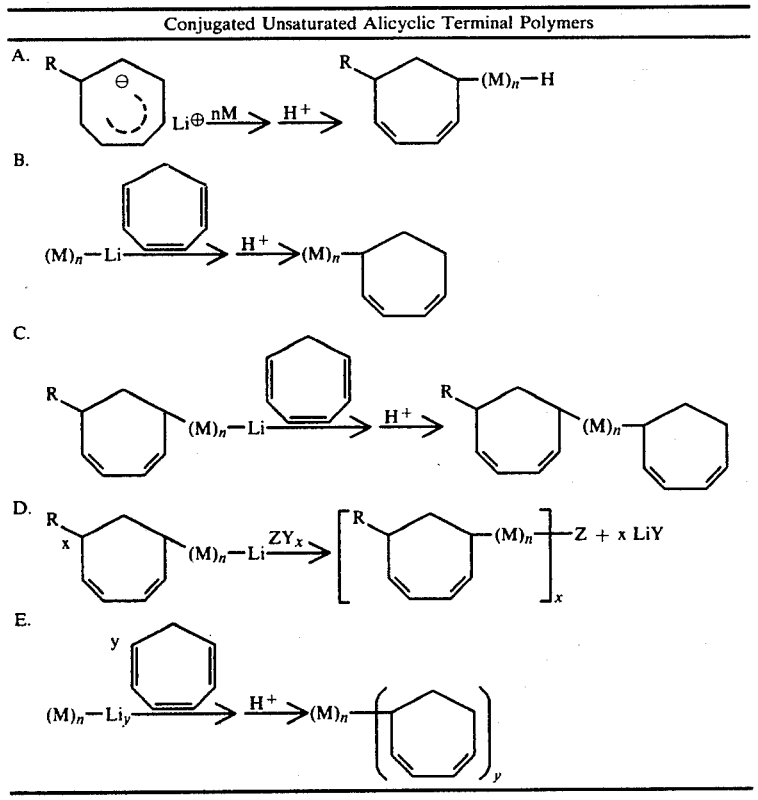

Conjugated Unsaturated Alicyclic Terminal Polymers wherein Li=lithium; M=monomer unit; H+=active hydrogen containing compound; $(M)_n$=polymer prepared from n units of monomer; $Li_y$=y units of lithium; and $ZY_x$=coupling agent of which $Y_x$=x number of active coupling locations Y.

Initiators

Cyclic Organomonolithium Initiators Having Delocalized Conjugated Unsaturation The cyclic initiators employed in one aspect of polymerization of this invention are prepared by reacting an organomonolithium compound with an essentially equimolar amount of an alicyclic conjugated triene or tetraene, the resulting lithium compound being the addition product of the two reactants. A method for preparing these alicyclic organolithium compounds is described in Th. J. Nieuwstad, A. P. G. Kieboom, A. J. Breijer, J. Van der Linden and H. van Bekkum, Rec. trav. chim. 95, 225 (1976).

Organomonolithium compounds suitable for this reaction can be represented by the formula RLi wherein R is a hydrocarbon radical selected from the group consisting of aliphatic, cycloaliphatic, and aromatic radicals, or combinations thereof, containing from 1 to about 20 carbon atoms.

Examples of such lithium compounds include methyllithium, n-butyllithium, sec-butyllithium, cyclohexyllithium, tert-octyllithium, n-decyllithium, phenyllithium, 1-naphthyllithium, 4-n-butylphenyllithium, p-tolyllithium, n-dodecyllithium, 4-phenylbutyllithium, 4-tert-butylcyclohexyllithium, and the like. Additionally useful are the corresponding organosodium and organopotassium compounds corresponding to the organolithium compounds described above.

Alicyclic conjugated trienes or tetraenes suitable for use in preparing the cyclic unsaturated organomonolithium compounds are the substituted and unsubstituted 1,3,5-cycloheptatrienes and 1,3,5,7-cyclooctatetraenes having the structures

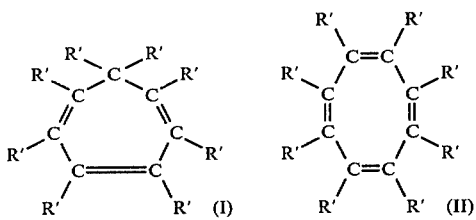

wherein R' is hydrogen or alkyl such that the total number of carbon atoms in the molecule does not exceed about 20. Presently preferred are 1,3,5-cycloheptatriene and cyclooctatetraene.

The reaction between the organomonolithium compound and the cyclic unsaturated compound is conducted under an essentially inert atmosphere in the presence of an inert complexing diluent. Suitable diluents include ethers such as tetrahydrofuran and diethylether, and tertiary amines such as triethylamine and tetramethylethylenediamine. Presently preferred is tetrahydrofuran. The reaction is conducted at temperatures in the range of about −100° C. to about 30° C., preferably about −30° C. to about 10° C. The reaction is allowed to proceed for about 15 minutes to several days, preferably about 45 minutes to about 6 hours. Although it is preferred to use the unsaturated cyclic initiator immediately after its preparation, it may be stored in solution at 0° C. or lower for an extended period of time prior to use.

Organomonolithium Initiators

Organomonolithium initiators also are suitable for use in preparing a polymer which has a terminal alicyclic conjugated unsaturated functional group. These are the same organomonolithium compounds (RLi) described above for use in preparing the unsaturated alicyclic initiators. Where the organomonolithium initiators are employed, the resulting polymer-Li is terminated with an unsaturated alicyclic terminating agent described hereinafter to result in a polymer having a terminal alicyclic group.

The organolithium multichelic initiators suitable for use when a conjugated unsaturated alicyclic telechelic polymer is prepared using the unsaturated alicyclic terminating compounds described earlier, are those having the formula R''' (Li)$_y$ in which R''' is a hydrocarbon radical and can be aliphatic, cycloaliphatic, or aromatic radicals, and contains 1 to about 20 carbon atoms, and y is an integer of 2 to 4. Examples of such multichelic initiators include dilithiomethane, 1,4-dilithiobutane, 1,4-dilithio-2-methyl-2-butene, 1,4-dilithionaphthalene, 1,2-dilithio-1,2-phenylethane, 1,4-dilithiocyclohexane, 1,8-dilithio-3-decene, 1,4-dilithiobenzene, 1,3,5-trilithiopentane, 1,5,15-trilithioeicosane, 1,3,5,8-tetralithiodecane, 1,2,3,5-tetralithiocyclohexane, and the like.

Other suitable multichelic organolithium initiators are the alpha-lithio multi-substituted dialkylbenzenes and corresponding oligomers which are normally used as a mixture in a suitable solvent. A typically used initiator of this type is referred to as DiLi-3 which is primarily 1,3-bis(1-lithio-3-methylpentyl)benzene.

Such hydrocarbyl lithium initiators are employed in an amount effective for polymerization of the monomer charge employed to the molecular weight desired. Typically an exemplary amount of such initiator would be in the range of about 0.05 to 100 millimoles per 100 grams of total monomers.

Monomers

Monomers which can be used to prepare the polymers of this invention are hydrocarbon conjugated dienes alone or copolymers with the hydrocarbon monovinylarenes.

The conjugated dienes ordinarily contain 4 to 12 carbon atoms per molecule, with those containing 4 to 8 carbon atoms being preferred for availability. Examples of the dienes include 1,3-butadiene, isoprene, 2,3-dimethyl-1,3-butadiene, piperylene, 3-butyl-1,3-octadiene, 2-phenyl-1,3-butadiene, and the like.

The monovinylarenes include such as styrene, 1-vinylnaphthalene, 2-vinylnaphthalene, and the alkyl, cycloalkyl, aryl, alkaryl, and aralkyl derivatives thereof in which the total number of carbon atoms in the combined substituents is generally not greater than 12. Examples of such substituted monomers include 3-methylstyrene, 4-n-dodecylstyrene, 2-ethyl-4-benzylstyrene, 4-p-tolylstyrene, 4-(4-phenyl-n-butyl)styrene, and the like.

The conjugated dienes can be polymerized alone or sequentially with or in admixture with the monovinylarenes to form homopolymers or copolymers including random and block copolymers. Monomers which are preferred for the practice of this invention are butadiene and styrene. The preferred polymers are those in which the conjugated dienes are present in a major amount.

Polymerization Conditions

Polymerization can be carried out at any convenient temperature employed in the solution polymerization arts. Suitable and exemplary temperatures lie in the range of from about −30° to about 200° C., presently preferred from about 40° to about 100° C.

The pressures employed can be as convenient, though preferably pressures are employed sufficient to maintain monomers and diluent substantially in the liquid phase.

The polymerization times can vary widely as may be convenient, and will, of course, be affected by polymerization temperatures chosen. Time preferably should be chosen such that substantially complete conversion of monomer to polymer is obtained and normally ranges from a few minutes to several hours.

The polymerization is conducted by methods well known in the art such as one step homopolymerizations, sequential monomer addition or random polymerization of monomer mixtures. The polymerization may be conducted by batch or continuous processes.

The polymerization process is usually carried out in the presence of a diluent. Suitable diluents are hydrocarbons which are not detrimental to the polymerization process. Suitable diluents include paraffinic, cycloparaffinic, and aromatic hydrocarbons, and mixtures thereof. Examples of such diluents include n-hexane, n-heptane, 2,3,4-triethylpentane, cyclopentane, cyclohexane, benzene, toluene, and the xylenes. The quantity of diluent employed can vary broadly. A typical polymerization employs the diluent in a quantity (by weight) of about 5 to 10 times the weight of all the monomers used. For the polymerization, ethers and amines can be used as diluents, such as THF, ethyl ether, dimethoxy ethane, t-amines, and their mixtures with hydrocarbon solvents. A suitable vinylizing agent, such as, THF, is a necessary reagent, of course, for the preparation of medium vinyl polybutadiene polymer when a lithium initiator is employed.

Various substances are known to be detrimental to the initiator and the living polymer of this invention. These detrimental substances include such as carbon dioxide, oxygen, and water. It is highly desirable, if not mandatory, therefore, that the reactants, the polymerization apparatus, and the reactant mixture be substantially freed of these materials as well as any other materials which inactivate the respective reactive species present throughout the process. Any of the known methods for removing such contaminants can be used. Therefore, when a diluent is employed in the process, it is preferred that this material be substantially free of impurities such as water, oxygen, and carbon dioxide. In this connection, it is desirable to remove the air and moisture from the reaction vessel in which the polymerization is conducted.

Treatment After Polymerization

Following polymerization, in accordance with a preferred aspect of our invention, the polymerization admixture is treated with a terminating compound prior to treatment with any other reagent to destroy the active lithium moieties.

Alicyclic Unsaturated Terminating Compounds

The presently preferred terminating compounds according to our invention include the alicyclic conjugated trienes and tetraenes (I) and (II) described earlier as being suitable for preparation of the alicyclic unsaturated initiators.

Also suitable are monohalogen substituted alicyclic dienes or trienes having structures

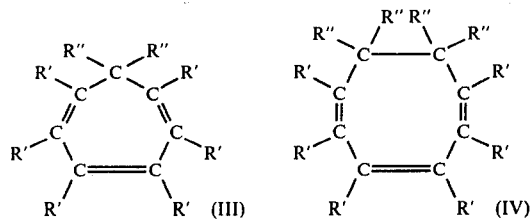

wherein R' is as described previously, and R'' can be R' or chlorine, bromine, or iodine, with the stipulation that only one R'' must be halogen in each molecule. Presently preferred are chloro and bromo alicyclic dienes or trienes. Examples include 7-bromo-1,3,5-cyclooctatriene, 7-chloro-1-methyl-1,3,5-cycloheptatriene, 7-chloro-1,3,5-cycloheptatriene, and the like. At least stoichiometric amounts are used based on the initiator level, and typically used is an excess to be sure to terminate all polymer lithium.

Coupling

Alternatively to the use of the alicyclic compounds, the polymerization admixture can be treated with a coupling agent to produce a linear coupled or branched product.

In our use of the term "coupling" as herein employed, the term is a broad generic term meaning the bringing together and joining by means of central coupling atoms or coupling moiety, two or more living monolithium-terminated polymer chains.

A wide variety of compounds as taught in the art for such purposes can be employed. Among the suitable coupling agents are the multivinylaromatic compounds, multiepoxides, multiisocyanates, multiimines, multialdehydes, multiketones, multihalides, multianhydrides, monoesters, multiesters which are the esters of polyalcohols with monocarboxylic acids, and the diesters which are the esters of monohydric alcohols with dicarboxylic acids, and other agents such as carbon monoxide, carbon dioxide, sulfur halides, the halogens, and the like. In addition, compounds containing more than one of these types of functional groups are suitable as coupling agents.

Examples of suitable multivinylaromatic compounds include 1,3-divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is satisfactory.

While multiepoxides in general can be used, those which are liquid are more readily handled and form a relatively small nucleus for the coupled polymer. Convenient among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2; 5,6; 9,10-triepoxydecane, and the like, also can be used.

Examples of suitable multiisocyanates include benzene-1,2,4-triisocyanate, naphthalene-1,2,5,7-tetraisocyanate, and the like. Convenient is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, also known as multiaziridinyl compounds, preferably are those containing 3 or more aziridine rings per molecule. Examples include the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, and the like.

The multialdehydes are represented by compounds such as 1,4,7-naphthalenetricarboxaldehyde, 1,7,9-anthracenetricarboxaldehyde, 1,1,5-pentenetricarboxaldehyde, and similar multialdehyde-containing aliphatic and aromatic compounds.

The multiketones are represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of the mono- and multiesters include butyl propionate, diethyl adipate, triethyl citrate, 1,3,5-tricarbethoxybenzene, and the like.

Among the multihalides, we presently prefer the silicon tetrahalides such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

In addition to the silicon multihalides as described hereinabove, other metal multihalides, particularly those of tin, lead, or germanium, also can be readily employed as coupling and branching agents. Silicon and other metal multialkoxides such as silicon tetraethoxide also are suitable.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2; 4,5-diepoxy-3-pentanone, 1,2; 4,5-diepoxy-3-hexanone, 1,2; 11,12-diepoxy-8-pentadecanone, 1,2; 18,19-diepoxy-7,14-eicosanedione, and the like.

Difunctional coupling agents can be employed where a linear polymer rather than a branched polymer is desired.

Broadly, and exemplarily, is a range of about 0.01 to 4.5 milliequivalents of coupling or branching agent are employed per 100 grams of monomer, presently preferred about 0.01 to 1.5. One equivalent of treating agent per equivalent of lithium is considered suitable where maximum branching is desired. The coupling agent can be added in hydrocarbon solution, e.g., in cyclohexane, to the polymerization admixture with suitable mixing for distribution and reaction.

Polymer Recovery

As is commonly practiced in polymerization processes, it is preferable to add an antioxidant to the polymer to retard potentially deleterious effects of contact with oxygen. A typical antioxidant is 2,6-di-t-buty-4-methylphenol, and an exemplary amount is in the range of about 0.5 to 1 part by weight per hundred parts monomers. The antioxidant is typically added to the polymerization reaction mixture prior to polymer recovery.

The polymer can be precipitated and the remaining carbon-lithium moieties, if any, inactivated by the addition of such as a lower alcohol, such as isopropyl alcohol, of by steam stripping, followed by separation of the product polymer from the polymerization diluent and other residual liquid by means such as decantation, filtration, or centrifugation, together with removal of volatiles at reduced pressure and moderate temperature such as about 60° C.

Compounding Ingredients

It is often desirable to compound the polymers of this invention with one or more ingredients well known in the rubber art. Suitable ingredients include, but are not limited to, fillers, reinforcing agent, extenders, plasticizers, processing aids, pigments, accelerators, vulcanizing and curing agents, activators, retarders, antioxidants, antiozonants, inhibitors, UV stabilizers, chemical and heat stabilizers, dispersing agents, lubricants, and the like.

The polymers of this invention may be blended or mixed with suitable compounding ingredients using any appropriate means known in the art, preferably, however, employing a hot mix technique such as is accomplished using a Banbury Mixer or a roll mill.

The polymers of this invention have a variety of useful applications, including use, for example, as vulcanizates, as adhesives, as impact resins, as mechanical rubber products, as well as a base polymer which can be further modified by utilization of the reactive conjugated unsaturated alicyclic terminal groups. Thus, for example, a crosslinked polymer may be prepared by initiating the polymerization of the reactive terminal groups, or these reactive terminal groups can be modified to other reactive functional groups via a Diels-Alder reaction.

EXAMPLES

Examples provided are intended to assist one skilled in the art to a further understanding of the invention. Particular materials employed, relationships, proportions, species, conditions, and the like, are intended to be illustrative of our invention and not limitative of the reasonable scope thereof.

EXAMPLE I

This example demonstrates the preparation of n-butylcycloheptadienyllithium.

n-Butyllithium (50 ml of 1.53 M heptane solution) was introduced into a previously dried and nitrogen purged 100 ml Pyrex-glass pressure tube equipped with a perforated crown cap over a self-sealing rubber gasket. After adjusting the temprature of this solution to $-78°$ C., 20 ml of tetrahydrofuran and 8 ml of 1,3,5-cycloheptatriene (0.077 moles) were added. The solution turned red in color almost immediately after addition of the 1,3,5-cycloheptatriene. This reaction mixture was maintained at $-78°$ C. for 15 minutes. The temperature was adjusted to 0° C. and the solution maintained at this temperature for one hour. During this period the solution became very dark in color. Dilution of 38 ml of this n-butylcycloheptadienyllithium solution with 279 ml of toluene gave a red-violet solution having a molarity of 0.1255 as determined by disulfide titration. This titration method is described in C. A. Uraneck, J. E. Burleigh, and J. W. Cleary, Analytical Chemistry 40, 327 (1968).

A medium vinyl polybutadiene was prepared using the n-butylcycloheptadienyllithium as initiator to give a polymer of a conjugated diene with terminal conjugated unsaturation.

Two polymers were prepared according to Recipe 1. The invention Run 1 used n-butylcycloheptadienyllithium as initiator, and control Run 2 used n-butyllithium as initiator. Polymerizations were conducted employing essentially anhydrous reagents and conditions under an inert atmosphere (nitrogen) in 10 oz. beverage bottles equipped with perforated crown caps over self-sealing rubber gaskets.

Recipe 1
n-Butylcycloheptadienyllithium Initiated
Polybutadiene Terminated With Alcohol

| Step I | Run 1 | Run 2 |
| --- | --- | --- |
| Cyclohexane, parts by weight | 1000 | 1000 |
| 1,3-Butadiene, parts by weight | 100 | 100 |
| Tetrahydrofuran, parts by weight | 5 | 5 |
| n-Butylcycloheptadienyllithium[a], mhm[b] | — | 10 |
| n-Butyllithium[c], mhm[b] | 10 | — |
| Polymerization temperature, °C. | 50 | 50 |
| Polymerization time, minutes | 45 | 45 |

[a]Added as a 0.1255M solution in toluene.
[b]Millimoles per 100 grams of monomer.
[c]Added as a 0.1181M solution in cyclohexane After the specified polymerization time, the antioxidant 2,4-di-t-butyl-4-methylphenol (two parts by weight per hundred parts of monomer) was added as a 10 weight percent solution in 80/20 (by volume) toluene/isopropyl alcohol, and the polymer coagulated by adding isopropyl alcohol to the polymerization mixture. The coagulated polymer was collected by filtration and dried under reduced pressure at 60° C. Conversion of monomer to polymer was 100 percent for both Runs 1 and 2. Physical properties of the polybutadiene polymers prepared are shown in Table II:

TABLE II

Physical Properties of Polybutadiene Prepared Using n-Butylcycloheptadienyllithium Initiator and Terminated with Alcohol

|  | Run 1 | Run 2 |
| --- | --- | --- |
| Inherent viscosity[a] | 0.24 | 0.31 |
| Gel, weight percent[b] | 0 | 0 |
| Conjugation, weight percent[c] | 0 | 0.122 |

[a]One-tenth gram of polymer was placed in a wire cage made from 80 mesh screen and the cage placed in 100 ml of toluene contained in a wide-mouth, 4-ounce bottle. After standing at room temperature (approximately 25° C.) for 24 hours, the cage was removed and a sample of the solution filtered-through a fritted glass filtering stick of C porosity and pressured directly into the viscometer. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
[b]Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it. By subtracting the weight of the empty cage from this value,the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.
[c]Determined by UV absorption spectroscopy and reported as weight percent 1,3-pentadiene due to the non-availability of 1,3-cycloheptadiene for extinction coefficient determination.

These data demonstrate that polymer having conjugated unsaturation can be prepared by initiating polymerization with n-butylcycloheptadienyllithium.

EXAMPLE II

This example demonstrates the reaction of live polybutadienyllithium with 1,3,5-cycloheptatriene or cyclooctatetrane to give polymers having conjugated unsaturation.

Using the general procedures as described in Example I, polymers were prepared according to Recipe 2. Run 3 was terminated following Step I, while Runs 4 and 5 were reacted in Step II with an excess of cyclic triene or tetraene before termination and polymer recovery. Conversion of monomer to polymer was essentially quantitative for each run.

Recipe 2
Reaction of Polybutadienyllithium with
1,3,5-Cycloheptatriene and Cyclooctatetraene

|  | Run 3 | Run 4 | Run 5 |
| --- | --- | --- | --- |
| Step I |  |  |  |
| Cyclohexane, parts by weight | 800 | 800 | 800 |
| 1,3-Butadiene, parts by weight | 100 | 100 | 100 |
| Tetrahydrofuran, parts by weight | 3.6 | 3.6 | 3.6 |
| n-Butyllithium[a], mhm | 9.1 | 9.1 | 9.1 |
| Polymerization temperature, °C. | 50 | 50 | 50 |
| Polymerization time, minutes | 60 | 60 | 60 |
| Step II |  |  |  |
| 1,3,5-Cycloheptatrine, mhm | — | 38.6 | — |
| Cyclooctatetraene, mhm | — | — | 26.6 |
| Polymerization temperature, °C. | — | 50 | 50 |
| Reaction time, minutes | — | 15 | 15 |

[a]Added as a 0.1141M solution in cyclohexane. Physical properties of these polymers are shown in Table III:

TABLE III

Physical Properties of Polybutadiene Having Terminal Cyclic Conjugated Unsaturated Functional Groups

| Property | Run 3 (Control) | Run 4 | Run 5 |
|---|---|---|---|
| Inherent Viscosity | 0.22 | 0.22 | 0.24 |
| Gel, weight percent | 0 | 0 | 0 |
| Molecular Weight, $M_w$[a] | 12,200 | 12,200 | 13,00 |
| Molecular Weight, $M_n$[a] | 10,900 | 11,100 | 11,300 |
| UV absorption at 254 mµ[b] | none | strong | medium |

[a]Determined using a gel permeation chromatography method as described by G. Kraus and C. J. Stacy, J. Poly. Sci. A-2 10, 657 (1972); and G. Kraus and C. J. Stacy, J. Poly. Sci.: Symposium No. 43, 329-343 (1973).
[b]As observed from gel permeation curve using UV detector monitoring at 254 mµ. A UV spectrum of n-butylcycloheptadienyllithium shows an absorption band at 245 mµ.

EXAMPLE III

The runs of this example demonstrate the preparation of medium vinyl polybutadiene having telechelic terminal conjugated unsaturated functional groups.

Using the general procedure described in Examples I and II, polymers were prepared according to Recipe 3:

| | Recipe 3 | | |
|---|---|---|---|
| | Run 6 | Run 7 | Run 8 |
| Step I | | | |
| Cyclohexane, parts by weight | 1000 | 1000 | 1000 |
| 1,3-Butadiene, parts by weight | 100 | 100 | 100 |
| Tetrahydrofuran, parts by weight | 4.5 | 4.5 | 4.5 |
| n-Butylcycloheptadienyllithium[a], mhm | 1.19 | 1.79 | 1.19 |
| Polymerization temperature, °C. | 50 | 50 | 50 |
| Polymerization time, minutes | 75 | 65 | 65 |
| Step II | | | |
| 1,3,5-Cycloheptatriene, mhm | — | — | 3.6 |
| α,α-Dichloro-p-xylene[b], mhm | — | 0.89 | — |
| Reaction temperature, °C. | — | 50 | 50 |
| Reaction time, minutes | — | 75 | 75 |

[a]Added as a 0.1255M solution in toluene.
[b]Added as a 0.0877M solution in cyclohexane.

Run 6 was terminated following Step I while Runs 7 and 8 were not terminated until after the completion of Step II. Conversion of monomer to polymer was essentially quantitative for each run.

Physical properties of these polymers are shown in Table IV:

TABLE IV

Physical Properties of Polybutadiene Having Telechelic Terminal Conjugated Unsaturation

| Property | Run 6 | Run 7 | Run 8 |
|---|---|---|---|
| Inherent viscosity | 2.17 | 1.74 | 2.13 |
| Gel, weight percent | 0 | 0 | 0 |
| Molecular weight, $M_w$ | 309,000 | 247,000 | — |
| Molecular weight, $M_n$ | 251,000 | 182,000 | — |
| Vinyl, percent[a] | 50.3 | 49.6 | — |
| Trans, percent[a] | 30.8 | 31.2 | — |
| Conjugation, percent[a] | 0.012 | 0.019 | 0.018 |

[a]Determined by UV absorption spectroscopy.

These data demonstrate that coupling of a n-butylcycloheptadienyllithium-initiated live polymer (Run 7), and that the reaction of the live polymer with cycloheptatriene (Run 8), results in polymers having a significantly higher level of conjugated unsaturation than polymer obtained by terminating the live polymer with alcohol (Run 6).

EXAMPLE IV

This example demonstrates the suitability of polybutadiene polymers containing terminal conjugated unsaturation for use in vulcanizable compounded stock.

Using the general procedures described in Examples II and III, polybutadiene polymers were prepared according to Recipe 4:

| | Recipe 4 | | |
|---|---|---|---|
| | Run 9 | Run 10 | Run 11 |
| Step I | | | |
| Cyclohexane, parts by weight | 800 | 800 | 800 |
| 1,3-Butadiene, parts by weight | 100 | 100 | 100 |
| Tetrahydrofuran, parts by weight | 3.6 | 3.6 | 3.6 |
| n-Butylcycloheptadienyllithium[a], mhm | — | 1.09 | — |
| n-Butyllithium[b], mhm | 0.90 | — | 0.90 |
| Polymerization temperature, °C. | 50 | 50 | 50 |
| Polymerization time, minutes | 85 | 70 | 115 |
| Step II | | | |
| 1,3,5-Cycloheptatriene, mhm | — | — | 3.86 |
| Reaction temperature, °C. | — | — | 50 |
| Reaction time, minutes | — | — | 20 |

[a]Added as a 0.0775M solution in toluene.
[b]Added as a 0.1405M solution in cyclohexane.

Conversion of monomer to polymer was essentially quantitative for all three runs. The properties of these polymers are shown in Table V:

TABLE V

Physical Properties of Polybutadienes Having Terminal Conjugated Unsaturation for Evaluation in Compounded Stock

| Property | Run 9 | Run 10 | Run 11 |
|---|---|---|---|
| Inherent viscosity | 1.89 | 1.90 | 1.81 |
| Gel, weight percent | 0 | 0 | 0 |
| Molecular weight, $M_w$ | 229,000 | 220,000 | 236,000 |
| Molecular weight, $M_n$ | 190,000 | 168,000 | 197,000 |
| Vinyl percent | 49 | 46 | 48 |
| Trans, percent | 30 | 32 | 30 |
| Mooney, ML-4 (raw)[a] | 43 | 40 | 36 |
| UV absorption at 254 mµ | no | yes | yes |

[a]ASTM D-1646-74

Each of these polymers was compounded according to the formulation given in Recipe 5:

| Recipe 5 | |
|---|---|
| Ingredient | Parts by Weight |
| Rubber | 100 |
| Carbon black[a] | 50 |
| Philrich ® 5[b] | 10 |
| Zinc oxide | 3 |
| Stearic acid | 2 |
| Flexamine G[c] | 1 |
| Sulfur | 1.75 |
| Santocure NS[d] | 0.8 |

[a]N330 type, Industry reference black number 4.
[b]A highly aromatic oil from Phillips Petroleum Company.
[c]An antioxidant consisting of 65% of a complex diarylamine-ketone reaction product and 35% of commercial N,N'-diphenyl-p-phenylenediamine from Uniroyal Chemical.
[d]An accelerator having the structure N-t-butyl-2-benzothiazolesulfenamide from Monsanto.

All ingredients except the sulfur and the accelerator were mixed in a Midget Banbury for about 5 minutes at 110 rpm and dumped at a temperature of 154° C. Sulfur was added and the stock further mixed for about 1.5 minutes at 80 rpm and dumped at a temperature of 110° C. The accelerator was then added and the stock yet further mixed for about 2.5 minutes at 80 rpm and dumped at a temperature of 110° C. Additional mixing was then done for about 3 minutes at 85° C. on a 3 inch roll mill. The compounded rubber stock was cured at 150° C. for 45 minutes. Properties of the vulcanized compounded rubber are shown in Table VI:

TABLE VI

| | Properties of Vulcanized Compounded Rubber | | |
|---|---|---|---|
| | Vulcanized Stock From Polymers Prepared In | | |
| Property | Run 9 (Control) | Run 10 | Run 11 |
| Tensile (23° C.)[a], MPa | 17.7 | 18.5 | 17.5 |
| Elongation (23° C.)[a], % | 500 | 490 | 500 |
| 200% Modulus (23° C.)[a], MPa | 3.9 | 4.0 | 3.9 |
| 300% Modulus (23° C.)[a], MPa | 7.8 | 8.3 | 7.1 |
| Compression set[b], % | 10.6 | 13.0 | 11.0 |
| ΔT[c], °C. | 34.9 | 31.6 | 35.1 |
| Resilience[d], % | 68.2 | 71.2 | 68.6 |
| Hardness, Shore A[e] | 58.5 | 58.0 | 57.5 |

[a]ASTM D412-75
[b]ASTM D395-69. Method B was modified as follows: Compression devices were used with 0.325 inch spacers to give a static compression for the 0.5 inch pellet of 35 percent. The test was run for 2 hours at 100° C. plus a relaxation (after treatment) of 1 hour at 100° C.
[c]ASTM 623-67
[d]ASTM D945-72. Test was modified in that specimen was a right circular cylinder 0.7 inch in diameter and 1 inch high.
[e]ASTM D2240-75.

These data demonstrate that medium vinyl polybutadienes having terminal conjugated unsaturation are suitable for use in vulcanizable compounded stock.

The data in Table VI for the experimental polymers, show that the properties of the vulcanizates are equivalent to or better than the properties of the control polymer, within accuracy of such measurements, even though the Mooney values are significantly lower than that of the control: 43, 40, 36. The 7-point spread is significantly lower.

The disclosure, including data, illustrates the value and effectiveness of our invention. The examples, the knowledge and background of the field of the invention and of general principles of chemistry and the other applicable sciences have formed the bases from which the broad descriptions of our invention including the ranges of conditions and generic groups of operant components have been developed, which have formed the bases for our claims here appended.

We claim:

1. The process for the preparation of a conjugated diene polymer containing alicyclic conjugated unsaturated functional groups which comprises:
    (a) polymerizing at least one conjugated diene hydrocarbon monomer, optionally further employing a hydrocarbon monovinylarene comonomer, employing an organolithium initiator, under anionic solution polymerization conditions, thereby preparing a polymerization admixture containing a conjugated diene polymer containing active lithium termination,
    wherein said organolithium initiator is a cyclic organomonolithium initiators having delocalized conjugated unsaturation,
    wherein said initiator is a product prepared by the addition reaction of approximately equimolar amounts of a hydrocarbyl monolithium compound with an alicyclic conjugated triene or tetraene selected from the group consisting of

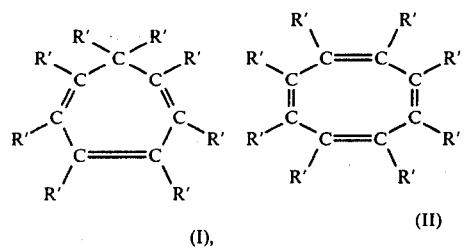

(I), (II)

wherein R' is hydrogen or alkyl such that the total number of carbon atoms in the molecule does not exceed 20, and
    thereafter (b) treating said polymerization admixture by a treating mode selected from the group consisting of (D), (E), and (F);
    wherein said treating mode (D) employs an active hydrogen-containing material effective to terminate the activity of said lithium termination, thereby resulting in a conjugated diene polymer containing terminal alicyclic conjugated unsaturated functional group singly per polymer molecule;
    said treating mode (E) employs at least a stoichiometric amount of alicyclic unsaturated triene or tetraene selected from the group consisting of

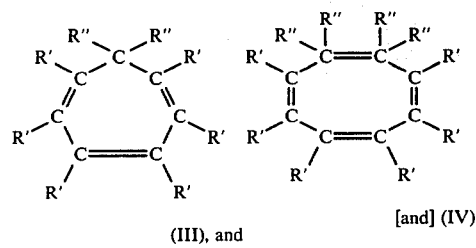

(III), and [and] (IV), wherein R" is R', chlorine, bromine, or iodine, with the proviso that only one R" is halogen in each molecule of said (III) or (IV), thereby resulting in a conjugated diene polymer containing terminal conjugated unsaturation, and
    said treating mode (F) employs a coupling agent capable of reacting with the resulting lithium, terminated polymer, thereby resulting in a coupled or branched polymer.

2. The process according to claim 1 wherein said step (b) employs said substep (E) wherein said alicyclic conjugated triene or tetraene is said (I) or (II).

3. The process according to claim 2 wherein said alicyclic conjugated triene or tetraene (I) or (II) is 1,3,5-cycloheptatriene or cyclooctatetraene.

4. The process according to claim 1 wherein said step (b) employs said substep (E) wherein said alicyclic unsaturated triene or tetraene is said (III) or (IV).

5. The process according to claim 4 wherein said (E) triene or tetraene (III) or (IV) is 7-bromo-1,3,5-cyclooctatetraene, 7-chloro-1-methyl-1,3,5-cycloheptatriene, or 7-chloro-1,3,5-cycloheptatriene.

6. The process according to claim 1 wherein said conjugated diene hydrocarbon monomer contains 4 to 12 carbon atoms per molecule.

7. The process according to claim 6 wherein said conjugated diene hydrocarbon monomer is 1,3-butadiene, isoprene, 2,3-dimethyl-1,3-butadiene, piperylene, 3-butyl-1,3-octadiene, 2-phenyl-1,3-butadiene, or mixture.

8. The process according to claim 1 wherein said polymerization step (a) is a copolymerization of a said conjugated diene hydrocarbon monomer with at least one said monovinylarene comonomer wherein said monovinylarene contains 4 to 20 carbon atoms per molecule.

9. The process according to claim 8 wherein said monovinylarene comonomer is styrene, 1-vinylnaphthalene, 2-vinylnaphthalene, 3-methylstyrene, 4-n-dodecylstyrene, 2-ethyl-4-benzylstyrene, 4-p-tolylstyrene, or 4-(4-phenyl-n-butyl)styrene.

10. The process according to claim 1 wherein said organolithium initiator is a reaction product of a said alicyclic conjugated triene or tetraene (I) or (II) with a hydrocarbyl monolithium compound selected from the group consisting of methyllithium, n-butyllithium, sec-butyllithium, cyclohexyllithium, tert-octyllithium, n-decyllithium, phenyllithium, 1-naphthyllithium, 4-n-butylphenyllithium, p-tolyllithium, n-dodecyllithium, 4-phenylbutyllithium, and 4-tert-butylcyclohexyllithium.

11. The process according to claim 10 wherein said initiator is a reaction product of 1,3,5-cycloheptatriene with n-butyllithium, and wherein said conjugated diene hydrocarbon monomer is butadiene.

12. The process according to claim 1 wherein in said step (b) said treating is by said mode (F) employing a coupling agent, wherein said coupling agent is selected from the group consisting of multivinyl aromatic compounds, multiepoxides, multiepoxides, multiisocyanates, multiimines, multialdehydes, multiketones, multihalides, multianhydrides, mono and multiesters, carbon monoxide, carbon dioxide, sulfur halides, and the halogens.

13. The process according to claim 1 wherein said treating step (b) is by said mode (D).

14. The process according to claim 1 wherein said treating step (b) is by said mode (E).

15. The process according to claim 14 wherein said mode (E) treating is with said (I).

16. The process according to claim 14 wherein said mode (E) treating is with said (II).

17. The process according to claim 14 wherein said treating mode (E) is with said (III).

18. The process according to claim 14 wherein said treating mode (E) is with said (IV).

19. The process according to claim 13 wherein in said step (a) said cyclic organomonolithium initiator (A) is n-butylcycloheptadienyllithium; said monomer is 1,3-butadiene; and said treating mode (D) and is with an alcohol.

20. The process according to claim 1 wherein in said step (a) said organolithium initiator is n-butylcycloheptadienyllithium, and said treating step (b) is by said mode (F) wherein said coupling agent is α,α-dichloro-p-xylene.

21. The process according to claim 1 wherein in said step (a) said organolithium initiator is n-butylcycloheptadienyllithium said treating step (b) is by said mode (E) and is with 1,3,5-cycloheptatriene.

22. A conjugated diene polymer containing alicyclic conjugated unsaturated functional groups selected from the group consisting of conjugated diene homopolymers, conjugated diene copolymers, and copolymers of at least one conjugated diene with at least one monovinylarene, prepared by the process which comprises:

(a) polymerizing at least one conjugated diene hydrocarbon monomer, optionally with a hydrocarbon monovinylarene comonomer, employing an organolithium initiator, under anionic solution polymerization conditions, thereby preparing a polymerization admixture containing conjugated diene polymer containing active lithium termination, wherein said organolithium initiator is a cyclic organomonolithium initiators having delocalized conjugated unsaturation, wherein said initiators is a reaction product of a hydrocarbyl monolithium compound with an alicyclic conjugated triene or tetraene selected from compounds of the formulae of the group consisting of

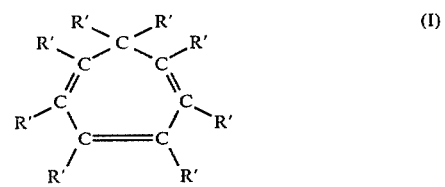

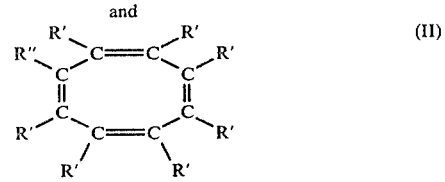

wherein R' is hydrogen or alkyl such that the total number of carbon atoms in the molecule does not exceed 20, and (b) treating said polymerization admixture by a treating substep selected from the group consisting of (D), (E) and (F);

wherein said treating substep (D) employs an active hydrogen-containing material effective to terminate the activity of said lithium termination, thereby resulting in a conjugated diene polymer containing terminal alicyclic conjugated unsaturated functional group singly per polymer molecule;

said substep (E) employs an alicyclic unsaturated triene or tetraene compound selected from the group consisting of

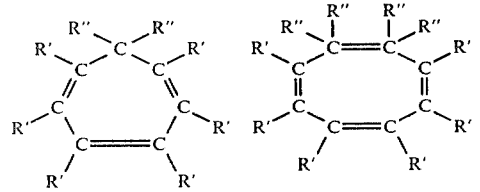

wherein R" is R', chlorine, bromine, or iodine, with the proviso that only one R" is halogen in each molecule of said (III) or (IV), thereby producing a conjugated diene polymer containing terminal conjugated unsaturation; and said substep (F) employs a coupling agent capable of reacting with the active alkali metal termination to couple said polymer, thereby producing a coupled or branched polymer.

23. The polymer according to claim 22 wherein said treating step (b) employs said substep (E) wherein said alicyclic conjugated triene or tetraene is said (I) or (II).

24. The polymer according to claim 23 wherein said alicyclic conjugated triene or tetraene (I) or (II) is 1,3,5-cycloheptatriene or cyclooctatetraene.

25. The polymer according to claim 22 wherein said treating step (b) employs said substep (E) wherein said alicyclic unsaturated triene or tetraene is said (III) or (IV).

26. The polymer according to claim 25 wherein said substep (E) triene or tetraene (III) or (IV) is 7-bromo-1,3,5-cyclooctatriene, 7-chloro-1-methyl-1,3,5-cycloheptatriene, or 7-chloro-1,3,5-cycloheptatriene.

27. The polymer according to claim 22 wherein said hydrocarbon conjugate diene monomer contains 4 to 12 carbon atoms per molecule.

28. The polymer according to claim 27 wherein said conjugated diene hydrocarbon monomer is 1,3-butadiene, isoprene, 2,3-dimethyl-1,3-butadiene, piperylene, 3-butyl-1,3-octadiene, 2-phenyl-1,3-butadiene, or mixture.

29. The polymer according to claim 27 wherein said polymerization step (a) is a copolymerization of a said conjugated diene hydrocarbon monomer with at least one monovinylarene comonomer wherein said monovinylarene contains 4 to 20 carbon atoms per molecule.

30. The polymer according to claim 1 wherein said monovinylarene comonomer is styrene, 1-vinylnaphthalene, 2-vinylnaphthalene, 3-methylstyrene, 4-n-dodecylstyrene, 2-ethyl-4-benzylstyrene, 4-p-tolylstyrene, or 4-(4-phenyl-n-butyl)styrene.

31. A polymer according to claim 22 wherein said organolithium initiator is a reaction product of a said alicyclic conjugated triene or tetraene (I) or (II) with a hydrocarbyl monolithium compound selected from the group consisting of methyllithium, n-butyllithium, sec-butyllithium, cyclohexyllithium, tert-octyllithium, n-decyllithium, phenyllithium, 1-naphthyllithium, 4-n-butylphenyllithium, p-tolyllithium, n-dodecyllithium, 4-phenylbutyllithium, and 4-tert-butylcyclohexyllithium.

32. The polymer according to claim 31 wherein said organolithium initiator is a reaction product of 1,3,5-cycloheptatriene with n-butyllithium, and wherein said conjugated diene hydrocarbon monomer is butadiene.

33. The polymer according to claim 22 wherein in said step (b) said treating is by said substep (F) employing a coupling agent, wherein said coupling agent is selected from the group consisting of multivinyl aromatic compounds, multiepoxides, multiisocyanates, multiimines, multialdehydes, multiketones, multihalides, multianhydrides, mono and multiesters, carbon monoxide, carbon dioxide, sulfur halides, and the halogens.

34. The polymer according to claim 22 wherein said treating step (b) is by said substep (D).

35. The polymer according to claim 22 wherein said treating step (b) is by said substep (E).

36. The polymer according to claim 35 wherein said treating substep (E) employs a said (I).

37. The polymer according to claim 35 wherein said treating substep (E) employs a said (II).

38. The polymer according to claim 35 wherein said treating substep (E) employs a said (III).

39. The polymer according to claim 35 wherein said treating substep (E) employs a said (IV).

40. The polymer according to claim 34 wherein in said step (a) said cyclic organomonolithium initiator is n-butylcycloheptadienyllithium; said monomer is 1,3-butadiene; and said treating substep (D) is with an alcohol.

41. The polymer according to claim 22 wherein said organolithium initiator is n-butylcycloheptadienyllithium, and said treating step (b) is by said substep (F) wherein said coupling agent is α,α-dichloro-p-xylene.

42. The polymer according to claom 22 wherein said organolithium initiator is n-butylcycloheptadienyllithium, said treating step (b) is by said substep (E) and is with 1,3,5-cycloheptatriene.

* * * * *

UNITED STATES PATENT AND TRADEMARK OFFICE
CERTIFICATE OF CORRECTION

PATENT NO. : 4,258,162
DATED : March 24, 1981
INVENTOR(S) : Carl A. Uraneck and John E. Burleigh It is certified that error appears in the above-identified patent and that said Letters Patent are hereby corrected as shown below:

Col. 14, lines 29 through 39, claim 1, Formula IV should be the same as Formula IV in col. 6, lines 1 through 10.
Col. 14, line 38, claim 1, below Formula IV, and before the "(IV)," the "[and]" should be deleted.
Col. 15, line 53, claim 19, after "mode" and before "(D)" should be --- is ---.
Col. 15, line 62, claim 21, after "tadienyllithium" at the beginning of the line and before "said" (first occurrence) should be --- and ---.
Col. 16, lines 51 through 60, claim 22, Formula IV should be the same as Formula IV in col. 6, lines 1 through 10.
Col. 16, line 59, claim 22, below Formula IV, before "(IV)," the "[and]" should be deleted.
Col. 17, line 18, claim 27, after "hydrocarbon" and before "diene", "conjugate" should be --- conjugated ---.
Col. 18, line 40, claim 42, after "thium;" at the beginning of the line and before "said" (first occurrence) should be --- and ---.

Signed and Sealed this

Twenty-first Day of September 1982

[SEAL]

Attest:

Attesting Officer

GERALD J. MOSSINGHOFF

Commissioner of Patents and Trademarks